Feb. 28, 1939.  C. W. LUGAR  2,148,868
CONTROL SYSTEM
Filed July 15, 1935  2 Sheets-Sheet 1

INVENTOR
Charles W. Lugar
BY HIS ATTORNEY
George H. Fisher

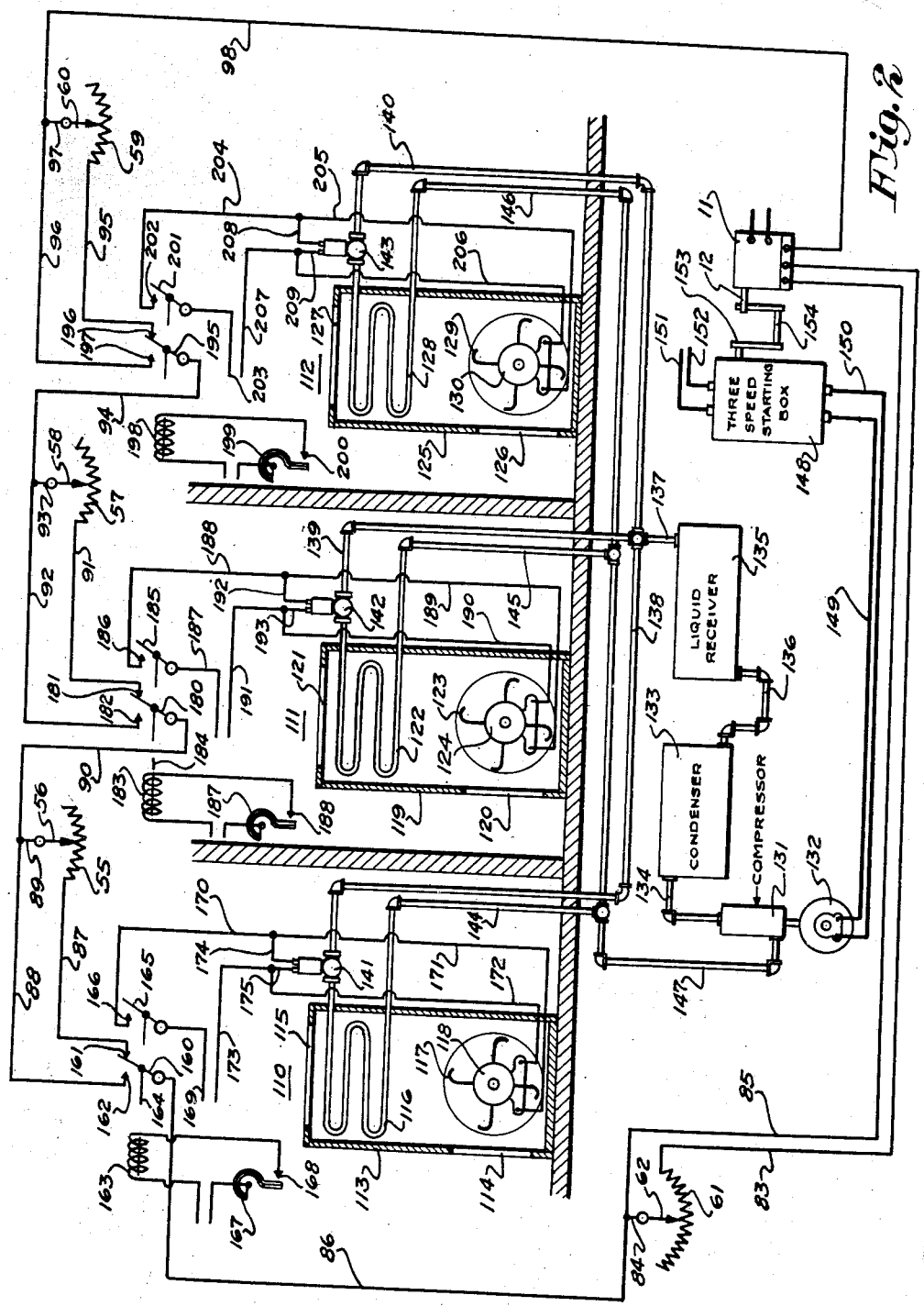

Patented Feb. 28, 1939

2,148,868

UNITED STATES PATENT OFFICE 2,148,868

CONTROL SYSTEM

Charles W. Lugar, Cleveland Heights, Ohio, assignor to Minneapolis-Honeywell Regulator Company, Minneapolis, Minn., a corporation of Delaware Application July 15, 1935, Serial No. 31,449

14 Claims. (Cl. 236—1)

The present invention relates to control systems in general but is particularly applicable to air conditioning systems and especially to the heating or cooling of a plurality of spaces.

An object of the invention is the provision of a condition controlling system in which a plurality of condition responsive controllers control a single control device or motor means in such manner that the device or motor means assumes a position depending upon the number of condition responsive controllers which are demanding a change in the conditions to which they respond.

Stated in another way, an object of the invention is the provision of an arrangement including a plurality of controllers and a controlled device or motor means controlled thereby wherein the device or motor means assumes a certain definite position when any one of a plurality of controllers demands a change in the condition to which it responds and assumes a different definite position when any two of the controllers demand a change in the conditions to which they respond.

A further object of the invention is the provision of a control system in which the condition of a condition changing fluid is controlled by a motor means or device that is positioned in accordance with the number of condition responsive controllers that are demanding a change in the conditions to which they respond, together with valve means for controlling the flow of such condition changing fluid, the valve means being controlled by the condition responsive controllers in such manner that the condition changing fluid is permitted to flow in such a manner as to only change the condition or conditions to which those controllers respond which are demanding a change in condition.

A further object of the invention is the provision of a control system for a plurality of individual coolers which are supplied with a cooling medium from a single refrigeration system, the control system being so arranged that a motor means which controls the refrigeration system is positioned in accordance with the number of coolers which are demanded to be in operation, together with individual control of the flow of cooling fluid to the coils of the individual coolers as well as individual control of the blowers or fans of the individual coolers.

A further object of the invention is the provision of an improved motor control system of general application.

Further objects of the invention will be found in the detailed description, the drawings and the appended claims.

For a better understanding of the invention, reference may be had to the following detailed description and the accompanying drawings, in which:

Fig. 2 is a diagrammatic showing of another application of the present invention.

Figure 1:
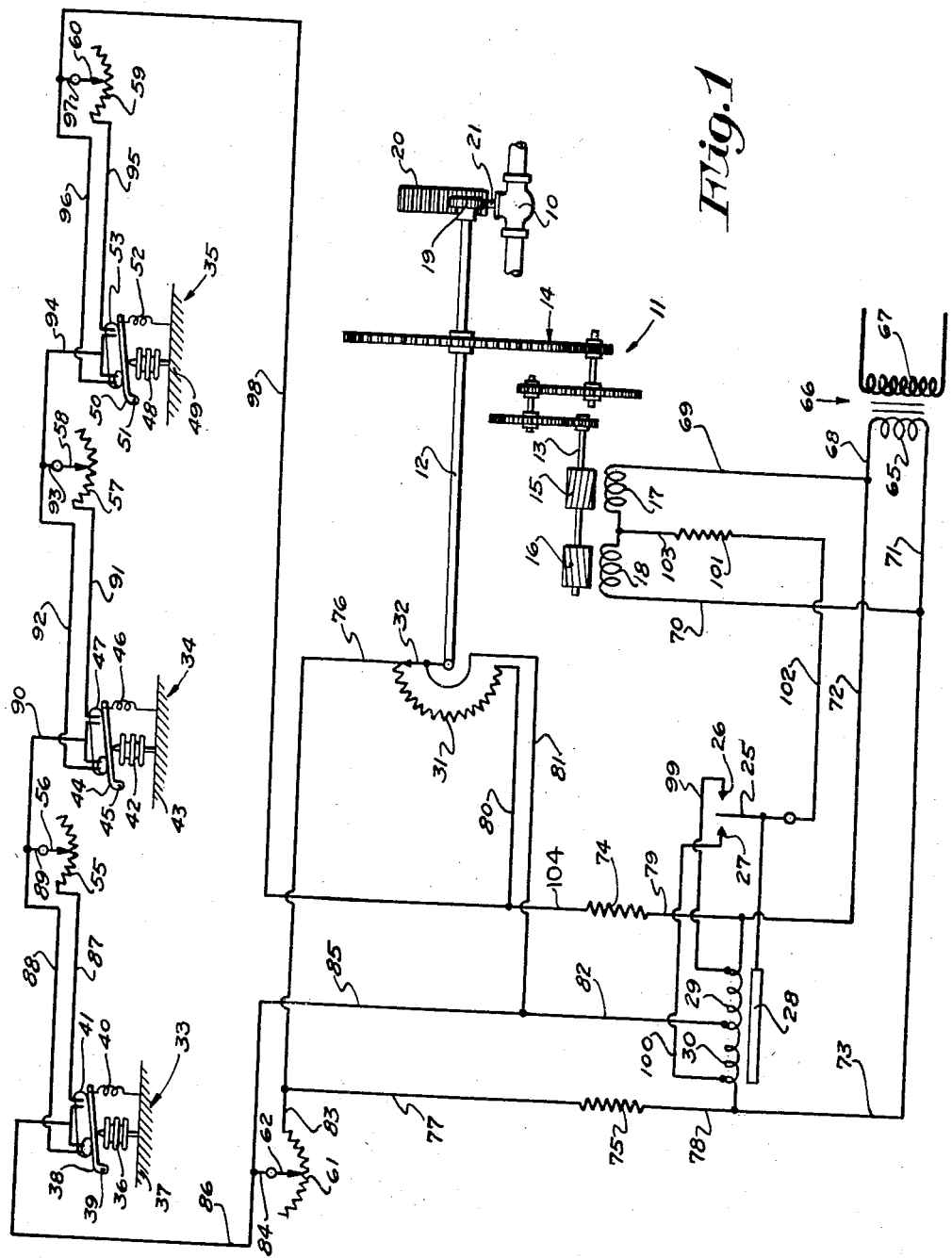
Fig. 1 is a diagrammatic showing of one form of the present invention.

Turning now to Fig. 1, a condition control device or element is herein illustrated as a valve 10. This valve 10 is controlled by a motor means generally indicated at 11. The motor means 11 includes a main operating shaft 12 which is connected to a rotor shaft 13 through suitable reduction gearing indicated at 14. Secured to the rotor shaft 13 are two rotors 15 and 16. Field windings 17 and 18 are associated with the rotors 15 and 16. The main operating shaft 12 carries a pinion 19 which cooperates with a rack 20 that is secured to the stem 21 of valve 10. It will be evident that counter-lockwise rotation of shaft 12, as viewed from the left, will result in downward movement of rack 20 and therefore a closing movement of the valve 10, whereas clockwise movement of this main operating shaft 12 will result in an upward movement of the rack 20 and an opening movement of valve 10.

Operative energization of field windings 17 and 18 is controlled by a switching mechanism comprising a switch arm 25 that is disposed between a pair of cooperating contacts 26 and 27. The switch arm 25 is controlled by and connected to a plunger 28 which is positioned by a pair of oppositely acting electrical devices herein shown as a pair of electro-magnetic coils 29 and 30. If the electro-magnetic coil 29 is more highly energized than the electro-magnetic coil 30, plunger 28 will move towards the right and move switch arm 25 into engagement with contact 26. On the other hand, if electro-magnetic coil 30 is more highly energized than electro-magnetic coil 29, the opposite action takes place in that switch arm 25 is moved into engagement with contact 27.

The motor mechanism 11 includes a variable resistance means in the form of a balancing potentiometer that is operated by the main operating shaft 12 for the purpose of always maintaining electro-magnetic coils 29 and 30 substantially equally energized as will become apparent hereinafter. This balancing potentiometer comprises a balancing resistance 31 and a balancing contact arm 32.

The unbalancing of the energizations of electro-magnetic coils 29 and 30 is controlled by a plurality of controllers, herein shown as three in number. These controllers are generally indicated at 33, 34 and 35. They may respond to any condition which it is desired to control or which it is desired to use as a controlling factor and are all herein illustrated as being temperature responsive double-circuit switching devices. The controller 33 comprises an actuating element in the form of a bellows 36 which has one of its ends secured to any suitable support 37 and is charged with a suitable amount of volatile fluid or expansible liquid so that changes in temperature cause expansion and contraction thereof. The other end of bellows 36 operates a switch carrier 38 which is pivoted as indicated at 39. The usual biasing spring is indicated at 40 and is shown as having one of its ends secured to the switch carrier 38 and its other end secured to the support 37. The switch carrier 38 supports a double-circuit type of mercury switch 41 that is provided with a pair of hot contacts in its left-hand end and a pair of cold contacts in its right-hand end.

The controller 34 similarly includes a bellows 42 which has one of its ends secured to a suitable support 43 and operates a switch carrier 44 that is pivoted as at 45. A spring 46 has one of its ends connected to the switch carrier 44 and its other end connected to the support 43. The switch carrier 44 supports a double-circuit mercury switch 47 that is provided with a pair of hot contacts in its left-hand end and a pair of cold contacts in its right-hand end. Likewise the controller 35 includes a bellows 48 which has one of its ends secured to a suitable support 49. The bellows 48 operates a switch carrier 50 which is pivoted at 51. A spring 52 has one of its ends connected to the switch carrier 50 and its other end is secured to the support 49. The switch carrier 50 supports a mercury switch 53 of the double-circuit type that is provided with a pair of hot contacts in its left-hand end and a pair of cold contacts in its right-hand end.

The three controllers 33, 34 and 35 control resistance means which is herein shown in the form of three separate resistances, although it will be evident that a single resistance with proper circuit connections thereto could be substituted for the three separate resistances herein disclosed. The first of these resistances comprises a resistance 55 and a cooperating manually operable contact arm 56. This resistance 55 is controlled by the controller 33 as will hereinafter become apparent. The controller 34 controls a similar resistance which comprises a resistance 57 and a cooperating manually operable contact arm 58. Likewise, the controller 35 controls a resistance comprising a resistance 59 and a cooperating manually operable contact arm 60.

The control system includes a further resistance means which is also shown in the form of a rheostat and comprises a resistance 61 and a cooperating manually operable contact arm 62.

Low voltage power is supplied to the system by the secondary 65 of a step-down transformer 66, having a high voltage primary 67 that is connected to suitable line wires. The field windings 17 and 18, in series, are connected across the secondary 65 by means of wires 68, 69, 70 and 71. The electromagnetic coils 29 and 30, in series, are also connected across the secondary 65 by means of wires 68, 72, 73 and 71. The balancing resistance 31 is connected in parallel with the series connected electromagnetic coils 29 and 30, through protective resistances 74 and 75, by means of wires 76, 77, 78, 79, 104 and 80. The balancing contact finger 32 is connected to the junction of electromagnetic coils 29 and 30 by means of wires 81 and 82. The end of resistance 61 is connected to the junction of wires 76 and 77 by means of a wire 83 and the cooperating manually operable contact arm 62 is connected to the junction of wires 81 and 82 by means of wires 84 and 85. One of the hot contacts and one of the cold contacts of mercury switch 41 of the controller 33 is connected to wire 85 by means of a wire 86. The other cold contact of mercury switch 41 is connected to the end of resistance 55 by a wire 87. The other hot contact of the mercury switch 41, the manually operable contact arm 56 and one of the hot and one of the cold contacts of the mercury switch 47 of controller 34 are interconnected by wires 88, 89 and 90. The other cold contact of mercury switch 47 is connected to one end of resistance 57 by a wire 91. The other hot contact of mercury switch 47, the manually operable switch arm 58 and one of the hot and one of the cold contacts of the mercury switch 53 of controller 35 are all interconnected by means of wires 92, 93 and 94. The other cold contact of mercury switch 53 is connected to one end of resistance 59 by a wire 95. The other hot contact of mercury switch 53, the manually operable switch arm 60 and the junction of wires 80 and 104 are interconnected by wires 96, 97 and 98. The contact 26 is connected to a small number of turns of electromagnetic coil 29 by a wire 99 and the contact 27 is similarly connected to a small number of turns of the electromagnetic coil 30 by a wire 100. The switch arm 25 is connected to the junction of field windings 17 and 18, through a protective resistance 101, by means of wires 102 and 103.

*Operation of the system of Fig. 1*

With the parts in the position shown in Fig. 1, the temperatures to which the controllers 33, 34 and 35 respond are all higher than desired as is evidenced by the fact that the hot contacts of their respective mercury switches 41, 47 and 53 are all closed. The electromagnetic coil 29 is therefore substantially short-circuited by the following circuit: starting at the left-hand end of electromagnetic coil 29, that is the junction between electromagnetic coils 29 and 30, this substantial short-circuit goes by way of wire 82, wire 85, wire 86, the hot contacts of mercury switch 41, wire 88, wire 90, the hot contacts of mercury switch 47, wire 92, wire 94, the hot contacts of mercury switch 53, wire 96, wire 98, wire 104, protective resistance 74 and wire 79 to the other end of electromagnetic coil 29. The electromagnetic coil 30 is likewise substantially short-circuited by a circuit as follows: wire 82, wire 81, balancing contact finger 32, wire 76, wire 77, protective resistance 75, and wire 78 to the other end of electromagnetic coil 30. Complete short-circuiting of electromagnetic coils 29 and 30, under these conditions, is prevented by the protective resistances 74 and 75 so that there is a small current flow through both of these electromagnetic coils 29 and 30. As a result, plunger 28 is positively positioned in its central position wherein switch arm 25 is intermediate contacts 26 and 27 and disengaged from both of them. With the balancing contact finger 32 in the position shown, main operating shaft 12 is in such position that the rack 20 is at its extreme upper position and valve 10 is completely opened. The valve 10 may, for instance, be utilized to control the flow of a cooling medium to a space or group of spaces to be controlled.

If the temperature to which any one of the controllers 33, 34 or 35 should now lower sufficiently to cause closure of the cold contacts and opening of the hot contacts in its mercury switch, one of the effective portions of resistances 55, 57 or 59 will be placed in parallel with the electromagnetic coil 29. If the temperature to which controller 33 responds should thus become sufficiently low, it will be noted that wire 86 will thereupon be connected to wire 87 which in turn is connected to resistance 55 and that the cooperating contact arm 56 is connected to wire 90 whereas wire 86 will be disconnected from wire 88. Lowering of the temperature to which controller 33 responds therefore places the effective portion of resistance 55 in parallel with electromagnetic coil 29. Similarly, lowering of the temperature to which controller 34 responds will place the effective portion of resistance 57 in parallel with electromagnetic coil 29 or the lowering of the temperature to which the controller 35 responds will place the effective portion of resistance 59 in parallel with electromagnetic coil 29. As a result, lowering of the temperature to which any one of the controllers 33, 34 or 35 responds will place a predetermined amount of resistance in parallel with electromagnetic coil 29.

The placing of this predetermined amount of resistance in parallel with electromagnetic coil 29 causes an increased current flow therethrough whereupon the plunger 28 is moved to the right and switch arm 25 is brought into engagement with contact 26. Up to this time, the field windings 17 and 18, in series, have been connected directly across the secondary 65 of transformer 66 so that both of them were equally energized and the main operating shaft 12 remained stationary, both of the motors being stalled under these conditions. Engagement of switch arm 25 with contact 26 however, places the protective resistance 101 and the small number of turns of electromagnetic coil 29 in parallel with field winding 17. Current now flows from secondary 65 through wires 71 and 70 and through the field winding 18; whereupon the circuit branches, part of the current flowing through field winding 17 and wires 69 and 68 to the other side of secondary 65 whereas the other portion flows by way of wire 103, protective resistance 101, wire 102, switch arm 25, contact 26, wire 99, the small number of turns of electromagnetic coil 29, and wire 72 to wire 68 and the same side of secondary 65. This current flow through the small number of turns of electromagnetic coil 29 exerts a further attractive force upon plunger 28, tending to move the same toward the right whereby the switch arm 25 is brought into good firm engagement with contact 26 whereby the pressure between the contact 26 and switch arm 25 is increased. This eliminates any tendency of "chatter" between the contact 26 and switch arm 25.

It will be seen that the full current flow that traverses field winding 17 and the protective resistance 101 and the small number of turns of electromagnetic coil 29 traverses field winding 18. Field winding 18 is therefore more highly energized than field winding 17 so that the associated rotor 16 exerts a greater torque upon rotor shaft 13 than does the associated rotor 15. Rotor 16 therefore rotates the rotor shaft 13 and the reduction gearing 14 in such a direction that main operating shaft 12 rotates in a counter-clockwise direction as viewed from the left. Balancing contact finger 32 therefore moves along balancing resistance 31 towards its lower end and in so doing places an increasing amount of resistance in parallel with the electromagnetic coil 30. As the amount of resistance in parallel with electromagnetic coil 30 is increased, the current flow through electromagnetic coil 30 likewise increases. When the balancing contact finger 32 has moved along balancing resistance 31 substantially one-third of its length, the increased current flow through electromagnetic coil 30 will have become sufficient to return plunger 28 to a position wherein switch arm 25 is disengaged from contact 26. Field windings 17 and 18 are thereupon again connected across the secondary 65 in series and are equally energized so that further rotation of main operating shaft 12 ceases. Also, the circuit through the small number of turns of electromagnetic winding 29 is interrupted so that the plunger 28 moves a little further to the left and separates the switch arm 25 from contact 26 an appreciable distance. This counter-clockwise rotation of main operating shaft 12 causes a downward movement of rack 20 and a corresponding closing movement of valve 10 so that valve 10 is moved to substantially two-thirds open position. In this manner, when any one of the controllers responds to a temperature sufficiently low to cause closure of the cold contacts of its associated mercury switch, the valve 10 is moved to a new position which corresponds to the number of controllers still demanding a call for cooling.

In a similar manner, if two of the controllers 33, 34 and 35 move to positions in which the cold contacts of their mercury switches are closed, two of the effective portions of resistances 55, 57, and 59 will be placed in parallel with electromagnetic coil 29. Under these conditions, plunger 28 will again move to the right and cause switch arm 25 to engage contact 26. The action described above will thereupon be repeated and balancing contact arm 32 will again be moved in a counter-clockwise direction along balancing resistance 31 until the same reaches a position in which it has traversed substantially two-thirds of the balancing resistance 31. When this occurs, the energizations of electromagnetic coils 29 and 30 will again be rebalanced so that further rotation of main operating shaft 12 ceases. The valve 10 has now been moved to a position in which it is one-third open since only one controller is now demanding a cooling action.

If the temperature to which all three controllers respond lowers sufficiently to cause closure of the cold contacts of their respective mercury switches, the effective portions of all three resistances 55, 57 and 59 will be placed in parallel with electromagnetic winding 29 so that the balancing contact finger 32 will move along the whole of balancing resistance 31 until it reaches the lower end thereof before the energizations of electromagnetic coils 29 and 30 will be rebalanced to cause the main operating shaft 12 to again stop. Under these conditions, valve 10 is completely closed since none of the controllers is demanding cooling.

It will be noted that the lower end of balancing resistance 31 is connected to the right hand end of electromagnetic coil 29 through protective resistance 74. As a result, the amount of resistance in parallel with electromagnetic coil 29 is not only dependent upon the position of the three controllers 33, 34 and 35 but is also dependent upon the position of balancing contact finger 32 in respect to balancing resistance 31. The reason for this connection between the lower end of balancing resistance 31 and the right-hand end of electromagnetic coil 29 is that the motor mechanism 11 is commercially built including a balancing potentiometer that is provided with the three leads such as are shown in the drawings. In order to compensate for this effect, and in order to make the main operating shaft 12 step in the desired position, it is necessary to insert a resistance in parallel with the electromagnetic coil 30. This resistance is shown as the rheostat comprised by resistance 61 and cooperating contact arm 84. It will be noted that the effective portion of resistance 61 is always connected in parallel with electromagnetic coil 30. If this resistance were omitted and wire 85 were connected directly to wire 77, then the electromagnetic coil 30 would be substantially short-circuited irrespective of the position of balancing contact finger 32 in respect to balancing resistance 31 but with this resistance 61 included, there is always a certain amount of resistance in parallel with electromagnetic coil 30 so that the same always has at least a predetermined minimum current flow therethrough.

Whenever the temperature to which any one of the three controllers responds again rises sufficiently to cause closure of the hot contacts of its associated mercury switch, one of the resistances 55, 57 or 59 is removed from its parallel relationship with electromagnetic coil 29, whereupon the electromagnetic coil 30 becomes more highly energized than the electromagnetic coil 29 and plunger 28 moves to the left. Switch arm 25 therefore engages contact 27 and the protective resistance 101 and a small number of turns of the electromagnetic coil 30 is placed in parallel with the field winding 18 whereupon the field winding 17 becomes more highly energized than the field winding 18. The rotor 15 thereupon exerts a greater torque than the rotor 16 so that the rotor shaft 13 is rotated in a direction opposite to that previously set out and main operating shaft 12 rotates in a clockwise direction as viewed from the left. Balancing contact finger 32 thereupon moves upwardly along balancing resistance 31 until the energizations of electromagnetic coils 29 and 30 are again rebalanced. Such rebalancing of the energizations of electromagnetic coils 29 and 30 causes switch arm 25 to separate from contact 27 whereupon the two field windings 17 and 18 are again equally energized and further rotation of main operating shaft 12 ceases. Valve 10 is thereby positioned in a substantially one-third open position. Deenergization of the small number of turns of electromagnetic coil 29 causes a wide separation of switch arm 25 and contact 27 as explained above in connection with contact 26.

If two of the three controllers move to such positions that the hot contacts of their mercury switches are closed, then two of the resistances 55, 57 and 59 are removed from their parallel relationship with electromagnetic coil 29 so that the main operating shaft 12 rotates further in a clockwise direction until the valve 10 has been moved to substantially two-thirds full open position. Likewise, when all three of the controllers return to the position shown in Fig. 1, the main operating shaft 12 moves to its extreme position wherein valve 10 is completely opened.

In this manner, the position of main operating shaft 12, and therefore of valve 10, depends upon the number of controllers that are demanding cooling and the number that are demanding no cooling. The amount that the temperature to which any particular controller responds is above or below the desired value has no influence on the ultimate position of the main operating shaft 12, the control of the main operating shaft 12 being effected entirely and exclusively by the number of controllers which are demanding cooling as compared to the number that are demanding heating or a lack of cooling.

Turning now to Fig. 2 of the drawings, a commercial embodiment of the invention is shown wherein it is applied to the control of a plurality of individual room coolers. Insofar as is possible, reference characters corresponding to those of Fig. 1 will be used. A plurality of rooms or spaces to be cooled are indicated at 110, 111 and 112. The room or space 110 is provided with an individual cooler 113 which is provided with an inlet 114 and an outlet 115. Located within the cooler 113 is a cooling coil 116 which is adapted to be supplied with any suitable cooling medium. A fan 117, which is driven by an electrical motor 118, operates to draw air from the room or space 110 through the inlet opening 114 and passes this air over the cooling coil 116 after which it is discharged back into the room or space through the outlet opening 115. The room or space 111 is provided with a similar cooler 119 that is provided with an inlet opening 120 and a discharge opening 121. The cooler 119 is similarly provided with a cooling coil 122 and with a fan 123 that is driven by an electrical motor 124. In a like manner, the room or space 112 is provided with a cooler 125 that includes an inlet opening 126 and a discharge opening 127. Located within the cooler 125 is a cooling coil 128 and a fan 129 that is driven by an electrical motor 130.

The cooling coils 116, 122 and 128 of the individual coolers 113, 119 and 125 may be provided with any suitable type of cooling medium and are herein shown as being provided with a refrigeration medium that is produced by a mechanical refrigeration system. This mechanical refrigeration system comprises a compressor 131 which is driven by an electrical compressor motor 132. The compressor 131 operates to compress the gaseous refrigerant as is usual whereupon this compressed gaseous refrigerant is passed to a condenser 133 by means of a pipe 134. The gaseous refrigerant temperature is reduced and the refrigerant liquefied by the condenser 133 after which it is passed to a liquid receiver 135 by means of a pipe 136. This liquid refrigerant is then passed to the respective cooling coils 116, 122 and 128 by means of pipes 137, 138, 139 and 140. An electrically operated solenoid valve 141 controls the flow of refrigerant from the pipe 138 to the cooling coil 116. Similarly, an electrically operated solenoid valve 142 controls the flow of refrigerant from the pipe 139 to the cooling coil 122. Likewise, a solenoid valve 143 controls the flow of refrigerant from the pipe 140 to the cooling coil 128. The refrigerant, after passing through the cooling coils 116, 122 and 128, is returned to the compressor by means of pipes 144, 145, 146 and 147.

The refrigeration system may be controlled in any suitable manner so that the effective amount of refrigeration produced thereby may be varied. In the present embodiment of the invention, this is done by operating the compressor motor 132 at varying speeds. The compressor motor 132 is connected to a three-speed starting box 148 by means of wires 149 and 150. Power is supplied to the three-speed starting box 148 by means of line wires 151 and 152. This three-speed starting box 148 is provided with a control arm 153, by means of which the starting box may be operated in such a manner that the compressor motor 132 is completely deenergized, is operated at a low speed, is operated at a minimum speed, or is operated at a high speed. In this manner, varying effective amounts of refrigeration may be produced by the refrigeration system. The control arm 153 of the three-speed starting box is operated by the motor means 11, the main operating shaft 12 thereof being connected to the operating arm 153 through a suitable crank 154.

The motor means 11 has built into it the relay mechanism comprised by electromagnetic coils 29 and 30 and has also contained therein the protective resistances 74 and 75 as well as the transformer 66. As in the case of Fig. 1, the position of the motor means 11 is controlled by cutting into or out of circuit the effective portions of resistances 55, 57 and 59.

The placing of the effective portion of resistance 55 into and out of circuit with the relay of the motor mechanism 11, instead of being controlled by the mercury switch 41, is shown as being controlled by an open contact switching mechanism of the double-circuit type. This double-circuit switching mechanism includes a switch arm 160 and cooperating contacts 161 and 162 to which the wires 86, 88 and 87 are respectively connected. This switching mechanism is a part of a relay which includes a relay coil 163 and a cooperating armature 164. The relay also includes a switch arm 165 and a cooperating contact 166. The relay coil 163 is controlled by a temperature responsive device which responds to the temperature of the room or space 110. This temperature responsive device is herein shown as comprising a bimetallic element 167 which, upon being heated to a predetermined degree, engages a contact 168 whereby to complete a circuit to the relay 163. The switch arm 165 and the contact 166 of this relay control the energization of the fan motor 118 of the cooler 113 and also control the energization of the solenoid valve 141. The circuit of fan motor 118 is as follows: line wire 169, switch arm 165, contact 166, wire 170, wire 171, fan motor 118, wire 172, and line wire 173. The energizing circuit for solenoid valve 141 is as follows: line wire 169, switch arm 165, contact 166, wire 170, wire 174, solenoid valve 141, and wire 175 to the line wire 173. It will be evident that upon a suitable rise in the temperature of the room or space 110, relay coil 163 is energized whereupon the solenoid valve 141 is energized to admit refrigerant to the cooling coil 116, the fan motor 118 is energized to cause the circulation of air over the cooling coil 116 and its discharge into the room or space 110, and the effective portion of resistance 55 is connected in circuit with the relay of motor mechanism 11 whereby to shift the main operating shaft 12 thereof a predetermined amount which in turn causes operation of the compressor motor 132 at a new speed.

In a similar manner, the placing of the effective portion of resistance 57 into and out of circuit with the relay of the motor mechanism 11 is controlled by a double-circuit open contact switching mechanism comprising a switch arm 180 and cooperating contacts 181 and 182 which are respectively connected to the wires 90, 91 and 92. The switch arm 180 and the contacts 181 and 182 form a part of a relay which includes a relay coil 183 and a cooperating armature 184. This relay further includes a switch arm 185 and a cooperating contact 186. Energization of the relay coil 183 is controlled by a temperature responsive controller which responds to the temperature of the room or space 111 and this temperature responsive controller is shown as comprising a bimetallic element 187 which, upon being heated to a predetermined degree, engages a cooperating contact 188 whereupon the relay coil 183 is energized in a manner that will be apparent upon an inspection of the drawings. The switch arm 185 and contact 186 control the energization of fan motor 124 and solenoid valve 142. The energizing circuit for fan motor 124 is as follows: line wire 187, switch arm 185, contact 186, wire 188, wire 189, fan motor 124, wire 190, and line wire 191. The energizing circuit for solenoid valve 142 is as follows: line wire 187, switch arm 185, contact 186, wire 188, wire 192, solenoid valve 142, wire 193 and line wire 191. It will be apparent then upon the temperature of the room or space 111 rising to such an extent that the bimetallic element 187 engages the contact 188, the effective portion of resistance 57 is placed in circuit with the relay of motor mechanism 11 whereby the compressor motor 132 is operated at a new speed, the solenoid valve 142 is energized to admit the flow of refrigerant from the pipe 139 to the cooling coil 122, and the fan motor 124 is energized to cause the passage of air over the cooling coil 122 and into the room or space 111.

Likewise, the effective portion of resistance 59 is placed into and out of circuit with the relay of motor mechanism 11 by means of a double circuit open contact switching mechanism comprising a switch arm 195 and cooperating contacts 196 and 197. Switch arm 195 is connected to wire 94, the contact 196 is connected to the wire 95 and the contact 197 is connected to the wire 96. This switching mechanism is a part of the relay that includes a relay coil 198, the energization of which is controlled by a temperature responsive controller which responds to the temperature of the room or space 112. This temperature responsive controller is herein shown as comprising a bimetallic element 199, which upon being heated to a predetermined degree, engages a cooperating contact 200. This relay mechanism also includes a switch arm 201 and a cooperating contact 202. The switch arm 201 and the cooperating contact 202 control energization of the fan motor 130 and also control energization of the solenoid valve 143. The energizing circuit for fan motor 130 is as follows: line wire 203, switch arm 201, contact 202, wire 204, wire 205, fan motor 130, wire 206, and line wire 207. The energizing circuit for solenoid valve 143 is as follows: line wire 203, switch arm 201, contact 202, wire 204, wire 208, solenoid valve 143, and wire 209 to line wire 207. As a result, whenever the temperature of the room or space 112 rises above a predetermined degree, bimetallic element 199 engages contact 200 whereby relay coil 198 is energized in a manner that will be evident upon an inspection of the drawings. Such energization of the relay coil 198 causes the effective portion of resistance 59 to be placed in circuit with the relay of the motor mechanism 11 whereupon the compressor motor 132 is operated at a new speed. Such energization of relay coil 198 also causes the solenoid valve 143 to be energized whereupon refrigerant is allowed to pass to the cooling coil 148. Simultaneously, the fan motor 130 is energized and causes the passage of air over the cooling coil 128 and into the room or space 112.

*Operation of the system of Fig. 2*

From the above description of the apparatus of Fig. 2, taken in connection with the description of the operation of the system of Fig. 1, it will now be apparent that whenever any one of the three controllers in any one of the three rooms or spaces demands a cooling action, the valve in control of the flow of refrigerant to the particular cooling coil is energized so as to permit the flow of refrigerant thereto, its associated fan motor is energized to cause the passage of air over such cooling coil and into the room or space, and a portion of one of the resistances 55, 57 or 59 is placed in circuit with the relay of the motor mechanism 11 so that the main operating shaft 12 of the same moves to a new position and in so doing operates the three-speed starting box 148 in such manner as to cause the compressor 132 to operate at a new speed. When none of these controllers is demanding a cooling action, the main operating shaft 12 of the motor mechanism 11 is in its extreme position, as shown, wherein the compressor motor 132 is entirely deenergized. Whenever any one of these controllers demands cooling, the main operating shaft 12 is moved a short distance and operates the three-speed starting box to energize the compressor motor 132 at a low speed. Similarly, when any two of the controllers demand cooling, the main operating shaft 12 is moved to a further position wherein the three-speed starting box energizes the compressor motor at an intermediate speed. Again, when all of the controllers are demanding cooling, the main operating shaft 12 of the motor mechanism 11 is moved to its other extreme position and the three-speed starting box is thereupon operated to energize the compressor motor at a maximum rate so that the same operates at high speed. In this manner, the refrigerating effect produced by the refrigeration system is dependent upon the number of controllers demanding a cooling action or not demanding such action so that the amount of refrigerating effect produced is comparable to the amount of refrigerating effect demanded. This control is entirely numerical and is independent of how high or how low the temperatures of the various rooms or spaces may rise or fall. Also, such demand for cooling by any controller, besides causing a change in operation of the refrigeration system, also permits such refrigerating effect to be utilized only in its associated cooler and further energizes only the fan of such cooler so that air is only passed over the cooling coil thereof and delivered only to the room or space demanding a cooling action.

It will be evident that a number of changes and modifications of the systems of the present invention can be made without departing from the spirit of the invention. While only three controllers have been shown in both of the systems disclosed in this application, it will be readily apparent that a greater number of controllers could be utilized if desired. In view of the fact that such changes may be made, the scope of the present invention is to be limited only by the claims appended hereto.

I claim as my invention:

1. A system of the class described, comprising, in combination, a plurality of heat transfer devices for changing the temperature at a plurality of spaced points, means to change the heat content of a fluid which is supplied to said heat transfer devices, flow controlling means selectively operable to control the flow of said fluid to each of said heat transfer devices, electric motor means in control of the means to change the heat content of said fluid and positionable in a number of positions corresponding to the number of heat transfer devices, a temperature responsive controller responsive to the temperature at each of said spaced points, and connections between said controllers, flow controlling means and motor means by which each controller controls the flow controlling means in a manner to control the flow of fluid to its associated heat transfer device and by which said motor means is positioned according to the number of controllers demanding a supply of said fluid.

2. In a temperature changing system, in combination, a plurality of heat transfer devices located at spaced points, a common temperature changing fluid for all of said heat transfer devices, separate valves controlling the flow of said fluid to each of said heat transfer devices, a condition responsive controller associated with each heat transfer device and controlling the valve for such heat transfer device, an electric motor means in control of the temperature changing fluid and positionable in a plurality of positions, and means associated with all of said controllers and said electric motor means and arranged to cause said electric motor means to assume different positions corresponding to the number of controllers demanding said temperature changing fluid.

3. In a temperature control system, in combination, a plurality of heat transfer devices for changing the temperature conditions at a plurality of spaced points, a common supply of temperature changing fluid for all of said heat transfer devices, electric motor means in control of said fluid and of the type which assumes a position depending upon the amount of resistance connected in circuit with a part thereof, resistance means associated with said part of the motor means, a plurality of temperature controlled switches controlled by the temperature at said spaced points, and connections by which each of said switches is operable to place a predetermined portion of said resistance means into or out of circuit with said part of the motor means.

4. In a temperature control system, in combination, a plurality of heat transfer devices for changing the temperature conditions at a plurality of spaced points, a common supply of temperature changing fluid for all of said heat transfer devices, electric motor means in control of said fluid and of the type which assumes a position depending upon the amount of resistance connected in circuit with a part thereof, resistance means associated with said part of the motor means, a plurality of temperature controlled switches controlled by the temperature at said spaced points, connections by which each of said switches is operable to place a predetermined portion of said resistance means into or out of circuit with said part of the motor means, and valves in control of the flow of said fluid to each of said heat transfer devices controlled by the temperature at the points controlled by their associated heat transfer devices.

5. In combination, a motor means of the type which assumes a position depending upon the amount of resistance connected in circuit with a portion thereof, a temperature changing mechanism controlled thereby, a plurality of separate resistances, a control switch associated with each resistance and controlled by temperature conditions, and electrical connections between said control switches, resistances and said part of the motor means enabling each control switch to place its associated resistance into or out of circuit with said part of the motor means whereby the motor means assumes a position depending upon the number of control switches demanding a change in temperature.

6. In combination, a motor means of the type which assumes a position depending upon the amount of resistance connected in circuit with a portion thereof, a temperature changing mechanism controlled thereby, a plurality of separate resistances, a control switch associated with each resistance and controlled by temperature conditions, and electrical connections between said control switches, resistances and said part of the motor means enabling each control switch to place its associated resistance into or out of circuit with said part of the motor means irrespective of the condition of the remaining control switches, the arrangement of the connections being such that all the resistances in circuit with said part of the motor means are connected in series.

7. The combination with an electrically controlled motor means of the type which assumes a position corresponding to the amount of resistance connected in circuit with a part thereof, of a pair of separate resistances, a pair of double circuit switches each having a common terminal and first and second terminals adapted to complete first and second circuits in conjunction with said common terminal, connections connecting one end of each resistance to one of said first terminals, connections connecting the second terminal of one of the switches and the common terminal of the other of the switches to the other end of one of said resistances, and connections connecting the remaining terminals of said switches to said part of the motor means whereby either of said resistances may be placed in circuit with said part of the motor means or both of said resistances in series may be connected thereto.

8. In combination, a plurality of heat transfer devices, a common supply of fluid therefor, a valve in control of the flow of fluid to each heat transfer device, motor means in control of the heat content of said fluid and of the type which assumes a position depending upon the amount of resistance connected in circuit with a part thereof, a plurality of separate resistances, a plurality of resistance controlling switches associated with the resistances and said part of the motor means and operable to place each resistance in circuit with said part of the motor means, a plurality of valve control switches, and a plurality of temperature responsive devices each of which controls one of the resistance control switches and one of the valve control switches.

9. In combination, a plurality of spaced coolers each including a cooling coil, a common supply of cooling fluid for all of said coils, a motor means in control of said cooling fluid, a plurality of temperature controllers associated one each with said cooling coils and each operative to cause a predetermined movement of said motor means upon a call for cooling, said movements being additive whereby the position of the motor means is dependent upon the number of controllers demanding cooling, a valve controlling the flow of fluid to each coil, and connections between each valve and its associated controller.

10. In combination, a plurality of coolers each including a cooling coil, a temperature responsive controller associated with each cooling coil, a refrigerating system for supplying a cooling medium to all of said coils, motor means in control of said refrigerating system and movable to a plurality of positions, connections between said controllers and motor means enabling each controller to move said motor means a predetermined amount upon a demand for cooling or upon a demand for less cooling, a separate valve in control of the flow of cooling medium to each of said cooling coils, and connections between each valve and its associated controller.

11. The combination with a plurality of individual coolers each including a cooling coil, a valve in control of the cooling coil and a blower for circulating air over the cooling coil, and a refrigeration system for supplying a cooling medium to all of said cooling coils, of a control system for the refrigeration system and coolers, comprising, in combination, a motor means movable to a plurality of positions in control of said refrigeration system, a controller associated with each cooler and operative to cause a definite movement of said motor means, all said movements of the motor means being additive, and separate switching means in control of each cooler valve and blower controlled by the associated controller.

12. The combination with a plurality of individual coolers each including a cooling coil, a valve in control of the cooling coil and a blower for circulating air over the cooling coil, and a refrigeration system for supplying a cooling medium to all of said cooling coils, of a control system for the refrigeration system and coolers, comprising, in combination, a motor means of the type which assumes a position depending upon the amount of resistance placed in circuit with a part thereof, resistance means associated with said part of the motor means, a plurality of switching mechanisms, connections between each switching mechanism, the resistance means, and one of the cooler valves and associated blowers by which the valve of a cooler can be opened, its blower operated and a portion of the resistance means placed in circuit with said part of the motor means, and a temperature responsive controller in control of each swtiching mechanism.

13. In combination, a pair of oppositely acting normally equally energized electrical devices, switching means controlled thereby, motor means controlled by the switching means, a fixed resistance connected in circuit with one of said devices, resistance means associated with the other of said devices, a plurality of control switches each arranged to place a portion of said resistance means into or out of circuit with the other of said electrical devices, and resistance means connected to said devices and operated by said motor means to maintain said devices substantially equally energized.

14. In combination, a pair of oppositely acting electrical devices connected in series across a source of power, a fixed resistance connected in parallel with one of said devices, resistance means, a control switch operable to place said resistance means in parallel with the other of said devices, switching means operated to a new position by said devices whenever their relative energizations are unequal to an appreciable extent, motor means controlled by said switching means, a balancing resistance member connected in parallel with said series connected devices, a balancing contact member cooperable with said balancing resistance member and connected intermediate said devices, and connections between said motor means and balancing members to move one in respect to the other.

CHARLES W. LUGAR.